United States Patent [19]

Samuels

[11] Patent Number: 4,484,395
[45] Date of Patent: Nov. 27, 1984

[54] BLUE PRINT SCALE

[76] Inventor: Ricardo Samuels, 21516 Jacksonville, Farmington Hills, Mich. 48018

[21] Appl. No.: 515,396

[22] Filed: Jul. 20, 1983

[51] Int. Cl.³ .............................................. G01B 3/02
[52] U.S. Cl. ..................................................... 33/494
[58] Field of Search .................. 33/494, 486, 487, 492

[56] References Cited

U.S. PATENT DOCUMENTS 1,235,801  8/1917  Hornig ................................... 33/494
1,602,490 10/1926  Homan ................................... 33/494

*Primary Examiner*—Willis Little
*Attorney, Agent, or Firm*—John R. Benefiel

[57] ABSTRACT

A scale is disclosed for use in making direct measurements in feet and inches on blue prints and the like drawn in various reduced scales. The scale features special inch character markings throughout the length of the scale to enable the user to directly read measurements in inches between corresponding foot measurements. The markings include 3, 6 and 9 inch subdivision and character markings with 6 inch markings for the smallest scale contemplated.

5 Claims, 6 Drawing Figures

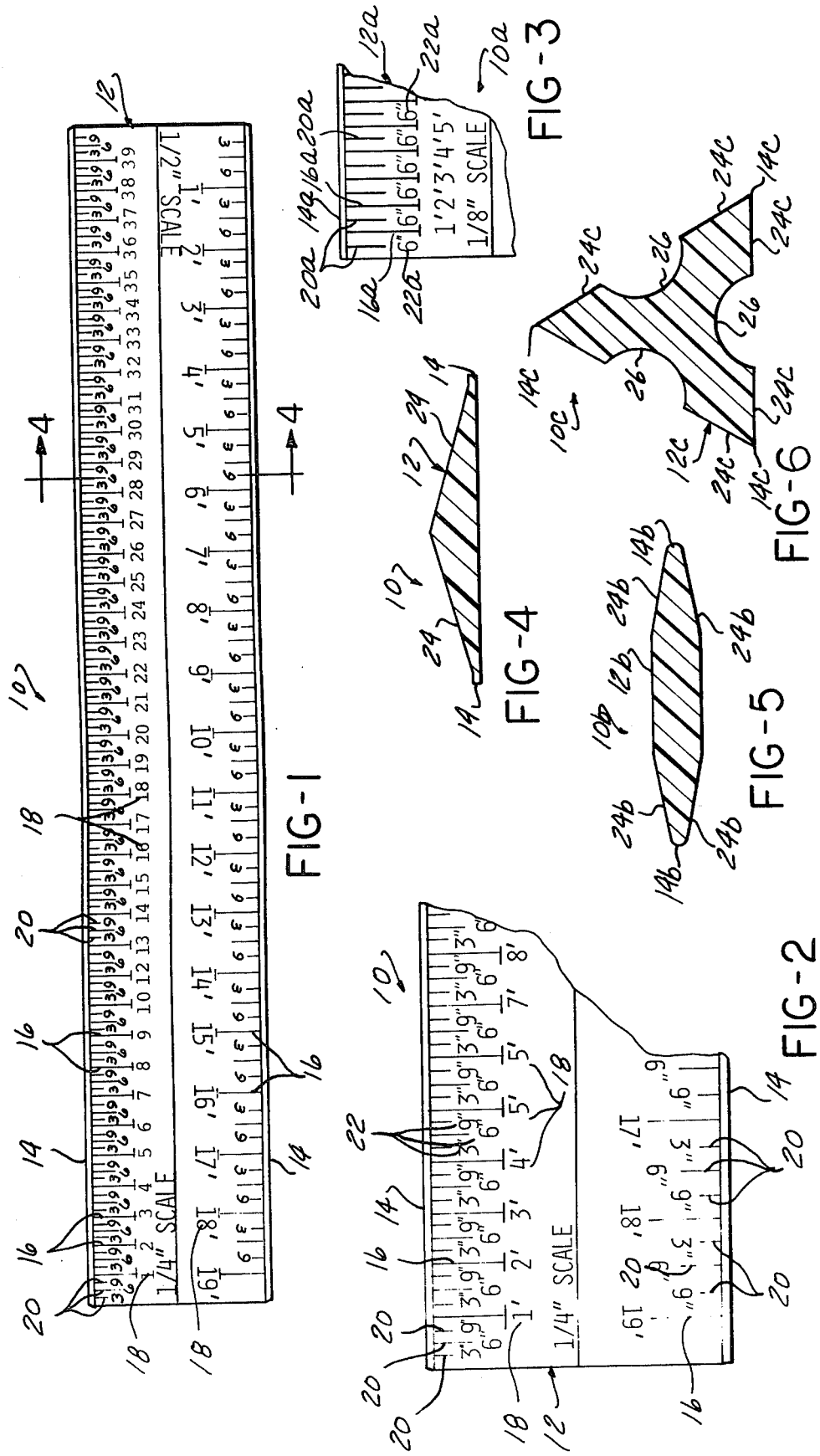

BLUE PRINT SCALE

BACKGROUND DISCUSSION

The present invention relates to measuring scales of the type used to make direct measurements on a reduced scale drawing. Such measurements are often employed in the building industry where blue prints are drawn to a reduced scale for use by various contractors. Such blue prints may be in a variety of scales depending on the usage and the type of blue prints, that is, for foundation prints generally of one-eighth inch to one foot scale is employed since the need for accuracy is at a minimum. For other purposes, larger scales, such as a quarter inch to one foot scale, may be employed. Even larger scales are for office planning scales, of three-quarter inch to one foot or greater may be employed.

It is common practice in planning a job such as wiring, plumbing, etc. from a blue print of a building, to make direct measurements necessary for estimating and planning the job, by use of an architectural scale to measure out the various distances directly from the blue print.

Conventional architect's scales generally have major increment markings corresponding to the foot markings in the reduced scale, and with subdividing markings intermediate the major scale markings marked with the foot designation.

These subdivision markings, however, have conventionally not been marked with numeral character markings, except in some cases where inch designations have been provided in the first major subdivision to indicate the corresponding inch designations. This requires the user to recognize the inch values corresponding to each subdivision marking, and to interpret these subdivision markings in the proper inch measurements. This requirement had led to inaccuracies due to errors in interpretation of such subdivisions, and also substantially slows the work of the user due to the mental effort required to interpret each of the subdivision markings in inches.

Accordingly, it is an object of the present invention to provide such a reduced measuring scale in which such effort is not required by the user to alleviate the source of errors and to facilitate the making of direct measurements on reduced scale drawings as described.

SUMMARY OF THE INVENTION

The present invention is achieved by providing a series of major division markings equispaced along the edge of a scale member. Each division marking has an adjacent corresponding numeral character in an ordinal series. That is, for quarter scale, there would be markings at one-quarter inch intervals down the length of the scale device. Each of these major markings would be marked with a successive numeral 1', 2', 3', 4', etc. in an ordinal series and preferably with foot designations as indicated.

Intermediate the major markings, there is contemplated as being provided subdivision markings at distances corresponding to even inches. The subdivision markings are all marked through the complete series with a corresponding numeral character in inches, i.e., 3 inch, 6 inch and 9 inch subdivisions are provided between each of the major markings.

Accordingly, the user may directly read out the inch designations from the scale, greatly reducing the time and effort of making large numbers of measurements and greatly reducing the incidence of misreadings.

A number of such scales can be included in a single scaling device, such as ¼ scale, ½ scale, ⅝ scale and ¾ scale, etc.

BRIEF DESCRIPTION OF THE DRAWINGS

FIG. 1 is a plan view of a measuring device with scale markings according to the present invention indicated thereon. FIG. 2 is an enlarged fragmentary view of the measuring device shown in FIG. 1.

FIG. 3 is an enlarged fragmentary view of an alternate embodiment showing a minimum scale with appropriate inch markings.

FIG. 4 is a sectional view taken along the lines 3—3 in FIG. 1.

FIG. 5 is a sectional view of an alternate form showing a reversible multi-scale measuring device.

FIG. 6 is a sectional view of another alternate embodiment showing a multi-scale triangular shape as is commonly used in architect's scales.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and indeed should not be so construed since the present invention may take various alternate forms than the specifics described herein.

Referring to FIG. 1, it can be seen that the measuring device 10 includes an elongated rigid member 12 having a plurality of parallel straight edges 14, extending down the length thereof. Along each of the straight edges 14 is a series of equispaced major division line markings 16, which markings consist of straight lines extending inwardly away from the respective straight edge 14. The distance between each pair of the major division markings 16 is in a fixed proportion with respect to the one foot distance, such as to provide a scale relationship between the major division markings and one foot, i.e., ¼ inch equals one foot for a typical scale.

In the embodiment shown in FIGS. 1 and 2, this proportion on the top edge viewed in FIGS. 1 and 2 is ¼ inch equals one foot, while the major division markings 16 correspond to ½ inch equals one foot. Both of these scales are typical scales employed in the construction industry drawings.

Immediately adjacent each major division marking 16 is an ordinal series of numeral character markings beginning at either end of the corresponding straight edge 14. Numeral character markings 18 are such that a direct reading in feet may be obtained by the user.

Along each straight edge 14 there is also provided a series of subdivision markings 20 which subdivide the space between each pair of major division markings 16. This subdividing is in a proportion corresponding to even inch measurements at the scale of the distance between major division markings 16. In the embodiment shown in FIGS. 1 and 2, there is provided three equally spaced subdivision markings 20 such as to divide the distance between each of the major markings 16 into four units. This corresponds to an even 3 inch distance at the scale of the distance between major division markings 16.

Immediately adjacent each of the subdivision markings 20 there is a numeral character marking 22 corresponding to the inch designation, increasing in a direction from one major division marking to the next increasing in the ordinal series. That is, three, six and nine inch numeral character markings are immediately adjacent each succeeding subdivisional marking along between each of the major divisional markings.

These numeral character markings are designated as inches as shown in FIG. 2, and are provided along the entire array of subdivisional markings such that a user may directly read in feet and inches distances on a working drawing at a point along an edge 14.

It can be appreciated that this will greatly facilitate the ease, speed and accuracy of making such measurements since the user need not interpret the inch subdivisional markings by tedious mental effort, but is provided a direct reading in inches at any point along the length of the straight edge.

In order to provide adequate space for the numeral character markings, a pattern is provided allowing offsetting of the character numeral markings while still affording easy readability.

This offset is provided by the extension of major division markings 16 laterally inward from the straight edge 14 at a distance substantially greater than the subdivision markings 20. The numeral character markings 18 immediately adjacent thereto are located inward from the edge 14 and in substantial alignment with the major division markings 16.

The subdivision markings 20 are also of staggered length in which the central subdivision marking 20 extends inwardly a distance greater than the other subdivision markings, and the numeral character marking associated therewith are immediately adjacent thereto. The shorter subdivision markings 20 have the numeral character markings 3" and 9". Each of the subdivision numeral character markings are located inward and substantially in line with the associated subdivision character markings 20 such as to provide the staggered pattern as seen in FIGS. 1 and 2.

Some drawings are in a reduced scale from the $\frac{1}{4}$ and $\frac{1}{8}$ inch to one foot shown in the improved measuring scale in FIGS. 1 and 2, such as foundation plans and the like. These are commonly at $\frac{1}{8}$ inch equals one foot since much less accuracy is required for such drawings.

FIG. 3 depicts a simplified scale 10a in which $\frac{1}{8}$ inch equals one foot and in such case the major divisional markings 16a, the distance between the major divisional markings 16a along the edge 14a, is subdivided by only single subdivision markings 20a which divides the space therebetween into two equal divisions corresponding to a 6 inch distance. In this case, the only character numeral marking 6 is used in correspondence to the inch equivalent of this distance.

In similar fashion, this character numeral designation associated therewith is repeated for each subdivisional marking provided down the length of the straight edge 14a.

Many configurations of the measuring scale are, of course, possible. As seen in FIG. 4, the scale member 12 is provided with an upper surface 24 on opposite sides immediately adjacent the opposite straight edges 14 upon which the various markings appear for a measuring scale having two scales or a series of markings as in FIGS. 1 and 2.

A greater number of scales can be accommodated by a reversible scale member 12b as shown in FIG. 5 in which surfaces 24b are provided on either side of the scale member 12b adjacent each of the straight edges 14b such that $\frac{1}{8}$, $\frac{1}{4}$, $\frac{1}{2}$ and $\frac{3}{4}$ scales may be employed, for example.

FIG. 6 shows a three-sided scale member 12c having six different marking surfaces 24c adjacent three different parallel straight edges 14c. The separate surfaces 24c are delineated by relief surfaces 26 such that a series of six scale series may be employed, such as $\frac{1}{8}$, $\frac{1}{4}$, $\frac{3}{8}$, $\frac{1}{2}$ and $\frac{3}{4}$, and may be employed on the same scale member in similar fashion to conventional architect scales.

Accordingly, it can be appreciated that the above arrangement achieves the object of the present invention in that the direct foot and inches measurements may be achieved by the user without the exercise of the mental concentration required in interpreting unmarked scale divisional markings as per conventional practice to greatly improve the speed, ease and accuracy of the process. This has been achieved without a substantial increase in the complexity of the scale itself other than the addition of the appropriate numeral character markings as described.

Many variations of the specifics of the embodiment shown are of course possible as discussed above.

I claim:

1. In a measuring scale for directly measuring distances in feet and inches on drawings made to a reduced scale, said measuring scale including:
    an elongated rigid member having at least one straight edge extending down the length thereof and equispaced major division markings arrayed thereon disposed along and extending to said straight edge, the distance between said major markings being on the order of fractions of an inch and having a fixed scale relationship to one foot;
    an ordinal series of numeral character markings each immediately adjacent a respective one of said major division markings in said series to provide a designation of a measured distance on a drawing in feet in said scale relationship;
    subdivision markings on said member arrayed along and extending to said straight edge subdividing the distance between each pair of major division markings in a fixed proportion corresponding to a fraction of a foot in even inches, the improvement comprising:
    a numeral character immediately adjacent each of said subdivision markings, said numeral characters each designating the number of inches that the subdivided distance of said subdivision marking represents in said scale relationship, whereby direct foot and inch readings may be made at any point along said straight edge.

2. The improved measuring scale according to claim 1 wherein there are provided three equispaced subdivision markings between each pair of major division markings, and the numeral character markings 3, 6 and 9 are marked immediately adjacent each subdivision marking in ascending order from each lower numbered major division marking to a higher numbered subdivision marking.

3. The improved measuring scale according to claim 2 wherein each of said major division markings extends in from said straight edge a distance substantially beyond each of said subdivision markings, and each of said numeral character markings adjacent thereto is located substantially laterally inward from said major division markings in a direction away from said straight edge, and wherein said subdivision markings with said numeral character markings of 6 extends further away from said straight edge than the subdivision markings having the numeral character markings of 3 and 9, and wherein each of said numeral character markings are substantially in line with and spaced inwardly from said subdivision markings immediately adjacent thereto, whereby said numeral character markings of 3 and 9 are offset those of 6, and from said numeral character markings adjacent said major division markings.

4. The improved measuring scale according to claim 3 wherein said elongated rigid member is formed with a plurality of parallel straight edges, and wherein a series of said major and subdivision markings are on each of said straight edges corresponding to a differing foot and inch scale.

5. The improved measuring scale according to claim 4 wherein one of said series of markings corresponds to ¼ inch equals one foot, and another of said series corresponds to ½ inch equals one foot.

* * * * *

UNITED STATES PATENT AND TRADEMARK OFFICE
CERTIFICATE OF CORRECTION

PATENT NO. : 4,484,395
DATED : 11/27/84
INVENTOR(S) : Ricardo Samuels

It is certified that error appears in the above–identified patent and that said Letters Patent are hereby corrected as shown below:

Column 5, line 7, after "offset" insert --from--.

Signed and Sealed this

Twenty-eighth Day of May 1985

[SEAL]

Attest:

DONALD J. QUIGG

*Attesting Officer*     *Acting Commissioner of Patents and Trademarks*